United States Patent [19]

Keith et al.

[11] Patent Number: 5,673,525
[45] Date of Patent: Oct. 7, 1997

[54] INSULATING CONNECTOR RODS USED IN MAKING HIGHLY INSULATED COMPOSITE WALL STRUCTURES

[75] Inventors: David O. Keith; David M. Hansen, both of American Fork, Utah

[73] Assignee: H.K. Composites, Inc., Orem, Utah

[21] Appl. No.: 731,469

[22] Filed: Oct. 15, 1996

Related U.S. Application Data

[63] Continuation of Ser. No. 558,734, Nov. 16, 1995, abandoned, which is a continuation-in-part of Ser. No. 225,910, Apr. 8, 1994, Pat. No. 5,519,973.

[51] Int. Cl.[6] .................................... F04B 1/62; F04B 5/00
[52] U.S. Cl. ................ 52/309.11; 52/309.7; 52/309.12; 52/410; 411/387; 411/487
[58] Field of Search .............................. 52/410, 309.1, 52/309.7, 309.11, 309.12, 511–514, 713; 411/487, 482, 439, 456, 387

[56] References Cited

U.S. PATENT DOCUMENTS

| | | | |
|---|---|---|---|
| 2,412,744 | 12/1946 | Nelson | 72/16 |
| 2,575,079 | 11/1951 | Temple | 85/28 |
| 2,595,123 | 4/1952 | Callan | 25/154 |
| 2,645,929 | 7/1953 | Jones | 72/103 |
| 2,653,469 | 9/1953 | Callan | 72/50 |
| 2,718,138 | 9/1955 | Jones | 72/48 |
| 2,775,018 | 12/1956 | McLaughlin | 72/19 |
| 2,964,821 | 12/1960 | Meehan | 25/131 |
| 3,000,144 | 9/1961 | Kitson | 50/268 |
| 3,131,514 | 5/1964 | Siek | 50/272 |
| 3,208,328 | 9/1965 | Myers | 85/1 |
| 3,304,676 | 2/1967 | Sallie et al. | 52/276 |
| 3,426,494 | 2/1969 | Hala | 52/410 |
| 3,523,395 | 8/1970 | Rutter et al. | 52/410 X |
| 3,646,715 | 3/1972 | Pope | 52/309 |
| 3,701,228 | 10/1972 | Taylor | 52/309 |

(List continued on next page.)

OTHER PUBLICATIONS

R. Layne, *Concrete-Plastic Sandwich Forms Walls Fast,* Popular Science, p. 1 (Sep. 1985).
*Sandwich Wall panels for Expanded Corporate Offices and Warehouse,* CI Journal, pp. 148–152 (Jul.–Aug. 1979).
W.E. Yates, *Lightweight Cladding Cut Costs at Worthing,* Concrete, pp. 12–13 (Dec. 1979).
P. Juhnke, *Tilt-Up Panels, Possible Key to Low-Cost Concrete Houses,* Concrete Construction, vol. 15, No.5, pp. 156–157 (May 1970).
Composite Technologies Corporation product brochure for "Thermomass Building System" (1990).
Composite Technologies Corporation product brochure for "Thermomass Building System" (date unknown).
Preco Precast Division product brochure for "Fosroc®" (date unknown).

*Primary Examiner*—Carl D. Friedman
*Assistant Examiner*—Winnie Yip
*Attorney, Agent, or Firm*—Workman, Nydegger & Seeley

[57] ABSTRACT

Highly insulating and substantially pointed connector rods used in making highly insulative composite wall structures. At least a substantial portion of the connector rod is injection molded in a single step from an appropriate resinous material or moldable plastic. The connector rod has a first substantially pointed end in a penetrating segment for facilitating entry through an insulating layer and for making abutting contact with a form sidewall when manufacturing a composite wall structure using a cast-in-place method. The opposite end, or trailing segment, also includes a substantially pointed end that makes abutting contact with another form sidewall. A middle or mesial segment resides within the insulating layer, which is sandwiched between two structural layers of a hardenable material, such as concrete. A first ridge or flange at the intersection between the mesial and trailing segments limits the depth of penetration of the connector rod when inserted through the insulating material. A second ridge or flange that is attached thereafter to the connector rod at the inspection between the mesial and penetrating segments locks the connector rod in place in a desired orientation within the insulating layer.

20 Claims, 4 Drawing Sheets

U.S. PATENT DOCUMENTS

| | | | |
|---|---|---|---|
| 3,750,355 | 8/1973 | Blum | 52/309 |
| 3,869,219 | 3/1975 | Wilson et al. | 403/282 |
| 3,879,908 | 4/1975 | Weismann | 52/309 |
| 4,018,023 | 4/1977 | Anderson | 52/410 |
| 4,139,975 | 2/1979 | Baker | 411/451 X |
| 4,157,001 | 6/1979 | Pickles | 52/506 |
| 4,329,821 | 5/1982 | Long et al. | 52/309.12 |
| 4,348,847 | 9/1982 | Jukes | 52/426 |
| 4,393,635 | 7/1983 | Long | 52/309.11 |
| 4,545,163 | 10/1985 | Asselin | 52/378 |
| 4,592,688 | 6/1986 | Kramer | 52/410 X |
| 4,597,702 | 7/1986 | Brown | 52/410 X |
| 4,624,089 | 11/1986 | Dunker | 52/410 |
| 4,702,053 | 10/1987 | Hibbard | 52/309.7 |
| 4,805,366 | 2/1989 | Long | 52/410 X |
| 4,829,733 | 5/1989 | Long | 52/410 X |
| 4,842,465 | 6/1989 | Pease et al. | 52/410 X |
| 4,907,928 | 3/1990 | Beck et al. | 411/307 |
| 4,932,819 | 6/1990 | Almeras | 411/441 |
| 4,945,700 | 8/1990 | Powell | 52/514 |
| 4,948,312 | 8/1990 | Jochum | 411/5 |
| 4,973,211 | 11/1990 | Potacek | 411/452 |
| 5,011,354 | 4/1991 | Brownlee | 411/439 |
| 5,031,378 | 7/1991 | Murphy | 52/410 X |
| 5,094,057 | 3/1992 | Morris | 52/511 |
| 5,265,998 | 11/1993 | Kluser | 411/480 |

INSULATING CONNECTOR RODS USED IN MAKING HIGHLY INSULATED COMPOSITE WALL STRUCTURES

RELATED APPLICATIONS

This application is a file-wrapper-continuation of U.S. application Ser. No. 08/558,734, filed Nov. 16, 1995, now abandoned for INSULATING CONNECTOR RODS USED IN MAKING HIGHLY INSULATED COMPOSITE WALL STRUCTURES (now abandoned), which is a continuation-in-part of U.S. application Ser. No. 08/225,910, filed Apr. 8, 1994, in the names of David O. Keith and David M. Hansen for "Highly Insulative Connector Rods and Methods for Their Manufacture and Use in Highly Insulated Composite Walls," now issued U.S. Pat. No. 5,519,973. For purposes of disclosure, the foregoing U.S. patent application is incorporated herein by specific reference.

BACKGROUND OF THE INVENTION

1. Field of the Invention

This invention relates to highly insulative connector rods used to secure together multiple layers of insulating and structural material within a composite wall structure. In particular, the connector rods secure together an insulating layer and preferably two structural layers on either side of the insulating layer. The connector rods are especially suited for construction of composite wall structures using the "cast-in-place" method.

2. The Relevant Technology

As new materials and compositions have been continuously developed, novel methods for synergistically combining apparently unrelated materials to form useful composites have also been deployed. In the area of building and construction, high strength structural walls have been fabricated and then coated or layered with highly insulative materials, which generally have relatively low structural strength, to provide a composite structure having both high strength and high insulation. Conventionally, the structural component, such as a wall, is built first, after which the insulating layer or sheet is attached to the structural component. Thereafter a protective cover is placed over the insulating material to protect and hide it. The purpose of the insulation barrier is to impede the transfer of thermal energy across the structural wall.

One of the least expensive and strongest building materials that has found extensive use in the construction industry is concrete, which is typically formed from a mixture of hydraulic cement, water, and an aggregate, including rocks, pebbles and sand. Unfortunately, concrete has the drawback of offering poor insulation compared to highly insulating materials such as fiberglass or polymeric foam materials. While an 8 inch slab of concrete has an R value of 0.64, a 1 inch panel of polystyrene has an R value of 5.0. Conversely, highly insulative materials, at least those of reasonable cost, typically offer little in terms of structural strength or integrity. Though lightweight aggregates having higher insulating ability may be incorporated within concrete to increase the insulating effect of the concrete, the use of perlite in an amount that has a dramatic effect on the insulation ability of the concrete will usually result in greatly decreased strength of the structure.

While structural walls made of cement or masonry can be fitted or retrofitted with any number of insulating materials, including insulating mats or sheets that are attached to the inner wall, or foams that are sprayed between an inner and outer wall, one strategy has been to manufacture a composite wall structure having two structural layers separated by a core insulating layer. However, in order for the two-structural-layer wall to have sufficient strength and integrity, and to prevent the two structural walls from collapsing together or separating apart during construction and subsequent use of the building, it is necessary to structurally bridge the two structural walls together. This has usually been accomplished through the use of metal studs, bolts, or beams.

However, because metal is a very good conductive material (and therefore has very low insulation), such studs, bolts, beams, or other means for structurally bridging the two walls together can also create a conduit or conductive thermal bridge across which heat can readily flow, notwithstanding their being surrounded by ample amounts of an insulating material. As a result, heat can rapidly flow from a relatively warm inside wall to a colder outside wall during cold weather, for example. Therefore, though the structural walls might be separated by a very efficient insulating material having a high R value (which is the measure of the resistance to flow of thermal energy, or heat, across the material), the net R value of the overall composite structure will often be far less when metal or other noninsulating connectors are used, thus negating or at least greatly diminishing the effect of the insulation layer. Of course, one might construct a building having no structural supports or connectors between the inner and outer walls; however, the result will be a wall having inadequate strength for most building needs.

Examples of composite wall structures using metal tie rods or studs may be found in the following U.S. Patents: U.S. Pat. No. 4,393,635 to Long, U.S. Pat. No. 4,329,821 to Long et at., U.S. Pat. No. 2,775,018 to McLaughlin, U.S. Pat. No. 2,645,929 to Jones, and U.S. Pat. No. 2,412,744 to Nelson. As stated above, the composite wall structures disclosed in these references have a substantially lower R value than that of the highly insulating layer due to the thermal bridging effect of the highly conductive metal studs or connectors that pass through the cross section of the insulating layer.

In order to minimize the problem of thermal bridging, some have employed connector rods having a metal portion that passes through the concrete layers and a thermally insulating portion that passes through the insulating layer (e.g., U.S. Pat. No. 4,545,163 to Asselin). Others have developed connector rods made entirely from high R-value materials. For example, U.S. Pat. No. 4,829,733 to Long (hereinafter the "Long '733 Patent") discloses a plastic shear connector used in forming an insulated wall having an inner and an outer concrete structural layer, with a highly insulating layer sandwiched therebetween. Although the plastic shear connector described in the Long '733 Patent has found some use in the construction industry, the design of the connector described therein, together with the method for making such a connector, create added materials, manufacturing, and labor costs due to the relatively inefficient method of forming and then using the connector set forth in the Long '733 Patent. A summary of the method used to manufacture the preferred connector rods disclosed in the Long '733 Patent, as well as a summary of the limitations in their use and effectiveness, are set forth in copending U.S. application Ser. No. 08/255,910, filed Apr. 8, 1994 (hereinafter the "Parent Application"), which has been incorporated by specific reference for disclosure purposes.

One method for manufacturing the composite wall structure described herein is the so-called "tilt-up" method, whose manufacture is described hereinbelow. An example of a preferred connector rod used in the tilt-up method is set forth in the Parent Application, which connector has a substantially printed tip at one end and an enlarged head at the other. Both aid in the placement of the connector rods compared to, e.g., the connector disclosed in the Long '733 Patent. The tilt-up method for manufacturing composite wall structures is typically carded out as follows.

First, concrete is poured into a horizontally configured form to form a first unhardened structural layer. Second, the insulating layer is placed over the surface of the still uncured first structural layer. Third, the connector rods are inserted through the exposed horizontal surface of the insulating layer so that a first portion of the connector rods extends into the interior of the uncured first structural layer, so that a second portion spans the width of the insulating layer, and so that a third portion extends outwardly from the insulating layer surface. The connector rods are preferably twisted in order to consolidate the uncured concrete into a locking structure or recess within the first portion of the connector rod to ensure eventual secure anchoring of the connector rod within the first horizontal slab. Fourth, either before or after substantial hardening of the first structural layer, a second concrete layer is poured over the surface of the insulating layer within a form in order to form the second structural layer. The third portion of the connector rods is preferably fully enveloped within the second structural layer. Fifth, after the first and second structural layers have been adequately cured and the forms removed, the horizontally positioned composite wall structure is tilted up vertically by means of a hoist or crane and positioned into the desired location.

A second method for manufacturing the composite wall structure is the "cast-in-place" method, wherein the structural walls are poured within a vertical form that has been built in a location at or near where the composite wall structure is to be finally located. A more detailed discussion of this method is set forth more fully hereinbelow. In the cast-in-place method, connector rods having a length corresponding to the width of the entire composite wall structure are placed substantially orthoginally through the insulating layer, with a first portion extending out of one surface of the insulating layer, a second portion extending through the width of the insulating layer, and a third portion extending out the other surface of the insulating layer. The insulating layer with the connector rods extending out of both surfaces is then placed vertically between the vertical form. The extended portions of the connector rods horizontally span the form and maintain the insulating layer in a properly spaced arrangement between the two walls of the form, with vertical spaces between each side of the insulating layer and the form where the structural material is to be poured. Thereafter, concrete or other hardenable structural material is poured between the two vertical spaces to form a structural layer on either side of the insulating layer. Upon curing and removal of the form, the structural layers and insulating layer are locked together by means of the connector rods to form the composite wall structure.

While the connector rods disclosed in the Long '733 Patent could be used in the cast-in-place method, they have the serious drawback of having flat, substantially rectangular end surfaces. This design has at least three drawbacks: (1) the rectangular end surfaces of the connector rods of the Long '733 Patent together with the relatively sharp comers of the rectangular ends can cause friction or hang-ups between the rectangular surface and the side walls of the forms when placing the insulating layer vertically in the form; (2) upon removal of the form from the composite wall structure, the exposed rectangular end surfaces of the connector rods will likely present a visual nuisance and the exposure through the composite wall surface can cause the connector rods to be exposed to potentially destructive environmental elements, such as chemical or solar attack; and (3) the rectangular volume occupied by the connector rods of the Long '733 Patent will tend to inhibit good consolidation of the concrete in the wall surface at or near the area around the rectangular end surfaces, particularly just beneath the flat portion of the connector rod abutting the sidewall surface of the form.

In light of the foregoing, what are needed are improved insulating connector rods and methods for manufacturing highly insulative composite wall structures.

In addition, what are needed are improved designs and methods for molding improved insulating connector rods in a single step that yet provide adequate strength and support in the manufacture of composition wall structures.

Additionally, what are needed are improved connector rods having a design that eliminates or at least greatly diminishes the tendency of either or both ends of the connector rod to be exposed on the composite wall surface, particularly when utilized in the cast-in-place method for manufacturing highly insulating composite wall structures.

What are further needed are improved connector rods that have a design which reduces the friction between the ends of the connector rods and the sidewalls of the forms during placement of the insulating layer within the form.

Finally, it would be an improvement in the art to provide improved connector rods having a design which improves the ability to achieve substantially complete consolidation of the concrete or other hardenable structural material in the outer surfaces of the structural layers, particularly at or near where the outer ends of the connector rods are oriented.

Such improved connector rods having improved design features and methods for manufacturing such connector rods having the aforesaid design features are set forth and claimed herein.

SUMMARY OF THE INVENTION

The present invention relates to improved designs and methods for manufacturing connector rods used in the manufacture of composite wall structures. In particular, such connector rods can be manufactured, at least substantially, in a single step and may be used in the manufacture of highly insulating wall structures having two concrete structural layers surrounding a highly insulating material sandwiched therebetween. Such wall connectors prevent or greatly reduce the flow of heat between the two concrete walls surrounding the insulative material, and also eliminate the tendency of one or both of the ends to be exposed within the surface of the final composite wall structure. In addition, the connector rods of the present invention reduce friction or potential hang-up between the connectors and the form sidewalls during placement of the insulating layer between the form sidewalls using the cast-in-lace method. They also promote better consolidation of concrete or other hardenable structural material in the outer surfaces of the structural layers, particularly at or near where the outer ends of the connector rods are oriented.

These objects and features have been accomplished by designing and manufacturing a connector rod having a substantially pointed tip at both ends. Such connectors rods are generally symmetrical and/or simple in design and construct, which allows them to be molded in a single step, such as by injection molding, resin transfer molding, or reaction injection molding, thereby eliminating the need to form the connectors in a multi-step fashion as has been the standard in the art for plastic connectors similar in design and construct to those disclosed in the Long '733 Patent.

In a preferred embodiment, the connector rod is injection molded from a polycarbonate resin or other high strength resin or moldable plastic material. Another preferred material is a polycarbonate "alloy" consisting of polycarbonate and polybutylene teraphthalate. In some cases, where increased tensile and bending strength are desired, fibers such as glass fibers, carbon fibers, mineral fibers, boron fibers, ceramic fibers, and the like may be impregnated within the resin to form a connector rod having increased strength and stiffness. The use of more flexible fibers, such as cellulosic, nylon, or other polymeric fibers would be expected to increase the toughness and decrease the stiffness of the connector rod. Nevertheless, where fibers are unnecessary it will be preferable not to use them due to the generally increased cost of their use.

In a preferred embodiment, the connector rod has a central shaft having at either end a substantially pointed tip, which facilitates the entry of the connector rod through the insulating layer, and which also ensures that there is only minimal contact between either end of the connector rod and the sidewalls of the form when used in manufacturing composite wall structures using the cast-in-place method. Of course, the connector rods disclosed and claimed herein are not limited to any particular method and may be used, for example, in the tilt-up method of manufacturing composite wall structures (although the connector rod having an enlarged head at one end, as in the Parent Application, is preferred). The combination of pointed tips at both ends of the connector rod greatly facilitates the use of the connector rod in the manufacture of composite wall structures and leads to a superior final product in which only a minimal mount of the connector rod is exposed within the composite wall surface. It also aids in placing the insulating layer between the form sidewalls and promotes better consolidation of the concrete or other hardenable structural material.

The central shift includes a middle portion, or "mesial segment", which is intended to reside within the insulating layer. The mesial segment is preferably designed to greatly reduce or prevent the incursion of concrete or other flowable structural material around the mesial segment and into the interior of the volume defined by the insulating layer. Such an influx of concrete into the insulating layer will create a thermal bridge through that portion of the insulating layer, which will reduce the overall insulating ability, or R-value, of the composite wall structure.

For purposes of clarity, the segment of the connector rod that includes the pointed tip that actually penetrates the insulating layer will hereinafter be referred to as the "penetrating segment", while the remaining segment that includes the other pointed end that does not penetrate the insulating layer will be referred to as the "trailing segment".

The substantially pointed ends within the penetrating segment of the connector rods of the present invention make it far quicker and easier for the technician to insert the connector rods through the insulation layer compared to, e.g., connectors having a rectangular cross-section on both ends, which design is commonly used in the industry. In addition, the substantially pointed end allows for easy penetration through an insulating material that has a greatly reduced hole size drilled therethrough, or even none at all, since the substantially pointed end makes the connector rod "self-tapping". Alternatively, the end could have a pyramidal (3-, 4-, or multi-faceted) shape rather than a conical tip and still fall within the definition of "substantially pointed". The result would be substantially the same in each case. A wedge-shaped or "chisel" end, which closes up to a line rather than a single point, would be less satisfactory, but superior to the rectangular surface of the prior art connectors.

The connector rod further includes one or more recessed portions in both the penetrating segment and the trailing segment into which the uncured concrete or other structural material will flow during casting of the structural walls. Upon hardening, the concrete or other structural material within the one or more recessed portions will firmly and reliable anchor the connector rod firmly within the structural layers of the composite wall structure. Vibrational forces applied to the form or "poking" with rods can be employed to help consolidate the concrete forming the structural walls.

On either end of the mesial segment, which is defined as that portion of the connector rod that resides within the insulating layer, is a flange or other means for locking the connector rod in place after being inserted through the insulating layer. One of the flanges can be integrally molded into the connector rod, although it can also comprise a plastic washer or disk that is slid over the connector shaft either before or after the connector rod is placed into the insulating layer. It is far simpler and cheaper for the flange at or near the interface between the mesial segment and trailing segment, which is opposite to the side of the connector being inserted through the insulating layer, to simply be integrally molded within the connector rod. This first, or prefixed, flange acts as a means for orienting the connector rod by limiting the depth of penetration through the insulating layer.

However, it is preferable that the flange at or near the interface between the mesial segment and the penetrating segment that is inserted through the insulating layer to be attached after inserting the connector rod through the insulating layer. Otherwise, this flange might tear too large of a hole through the insulating layer and create the possibility of back flow of uncured concrete or other structural material into the enlarged hold, thereby creating a thermal bridge in the vicinity of the incursion. The second flange preferably comprises a plastic washer that is simply snapped onto the connector rod after it has been inserted through the insulating layer. It may be locked into place by any known means, such as fitting into a small groove or recess within the central shaft at or near the interface between the mesial segment and the penetrating segment. The hole within the plastic washer will preferably be slightly smaller than the circumference of the penetrating segment, but because the washer will typically be slightly flexible, it will be possible for the hole in the washer to temporarily expand when the washer is inserted over the penetrating segment and then contract after it reaches the locking groove or recess to become locked in place.

Alternatively, the plastic washer might have, e.g., an elliptical hole that corresponds to an ellipsoidal profile of the connector rod. The locking grove or recess at or near the interface between the mesial segment and the penetrating segment might be somewhat more circular than elliptical, such that when the plastic washer is twisted relative to the connector rod, it becomes locked in place. Rotating the washer back the other way unlocks the washer for easy removal.

The washer might also simply be a self-locking washer that is press-fitted over the connector rod without a locking groove or recess. The washer is held in place due to the pressure of the inner wall against the outer surface of the connector rod. It is pushed on until it reaches the insulating layer, thereby causing the connector rod washer can be adapted with little cuts around the interior wall in order to allow the inner wall to flex somewhat when being inserted over the connector rod.

Finally, although plastic washers are preferred, the washers can be made of any material that allows the locking of the connector rod in place after being inserted through the insulating layer. Because the washer is located on the outer surface of the insulating layer it can be made of, e.g., metal without adversely affecting the insulating ability of the insulating layer.

From the foregoing, an object of the present invention is to provide improved insulating connector rods and methods for manufacturing highly insulative composite wall structures.

A further object and feature of the present invention is to provide improved designs and methods for molding improved insulating connector rods in a single step that yet provide adequate strength and support in the manufacture of composition wall structures.

Yet another object and feature is to provide an improved connector rod design that eliminates or at least greatly diminishes the tendency of either or both ends of the connector rod to be exposed on the composite wall surface, particularly when utilized in the cast-in-place method for manufacturing highly insulating composite wall structures.

An additional object and feature of the present invention is to provide improved connector rods that have a design that reduces the friction between the ends of the connector rods and the sidewalls of the forms during placement of the insulating layer within the form.

A further object and feature of the present invention is to provide improved connector rods having a design which improves the ability to achieve substantially complete consolidation of the concrete or other hardenable structural material in the outer surfaces of the outer layers, particularly at or near where the outer ends of the connector rods are oriented.

These and other objects and features of the present invention will become more fully apparent from the following description and appended claims, or may be learned from the practice of the invention as set forth hereinafter.

DETAILED DESCRIPTION OF THE PREFERRED EMBODIMENTS

The present invention relates to specially designed, highly insulative connector rods used in the manufacture of composite wall structures, and methods for the manufacture and use of such connector rods. Such connector rods can be manufactured in a single step to yield connector rods having a wide variety of structural features and accessories therein. Such connector rods are designed to secure together two structural layers that are separated a predetermined distance by an insulating layer therebetween comprising a highly insulating, or high R value, material. Because the connector rods also are made from a high R value material, they prevent or greatly reduce the flow of heat between the two concrete walls compared to, e.g., metal connectors. The design of the connector rods makes them especially useful in the manufacture of composite wall structures using the cast-in-place method. However, they are not limited to any particular method for manufacturing composite wall structures.

The connector rods of the present invention are preferably injection molded from any appropriate resin or other high strength plastic material, although they may also be molded by resin transfer molding, reaction injection molding, or any other single-step or relatively simple molding process known in the art. An important criterion is that the manufacturing costs of the molding process be commensurate with the overall cost parameters of the connector rod to be used.

A preferred resinous material is polycarbonate resin because of the ease with which it may be injection molded. Another similar resinous material is polycarbonate-polybutylene teraphthalate alloy, which is less expensive than polycarbonate resins. Other resins, such as epoxy resins, thermoset plastics, and other high strength, high R-value materials, may be used. An important criterion is to select a resinous material or other plastic having the desired properties of strength and insulation depending on the performance criteria of the composite wall structure to be fabricated.

Although not necessary in many instances, it may be desirable to incorporate within the resinous material or other plastic material fibers such as glass fibers, carbon fibers, boron fibers, ceramic fibers, and the like in order to increase the tensile strength, bending strength, and toughness of the connector rod. Fibers can also increase the shear strength of the connector rod if adequately randomly dispersed throughout the resinous or other plastic material. Nevertheless, where fibers are not necessary in order to impart greater strength or stiffness to the connector rod, it will usually be preferable to exclude them due to the generally increased cost of their use.

Because the use of resins or other moldable plastics (whether or not impregnated with fibers) allows for an almost endless variety of design configurations that can be molded into a connector rod in a single step, such connector rods can include a wide variety of structural features or accessories without increasing the cost of manufacture. Many connector rods presently used in making composite wall structures are formed by pulltruding continuous fibers through a resinous material, which thereafter must be cut, machined, and then retrofitted with even the most minor additional structural features due to the limitations inherent in the pull-trusion method of molding. Pull-trusion, like extrusion, is inherently only capable of yielding rods of uniform cross-section corresponding to the die head design.

Figure 1A:
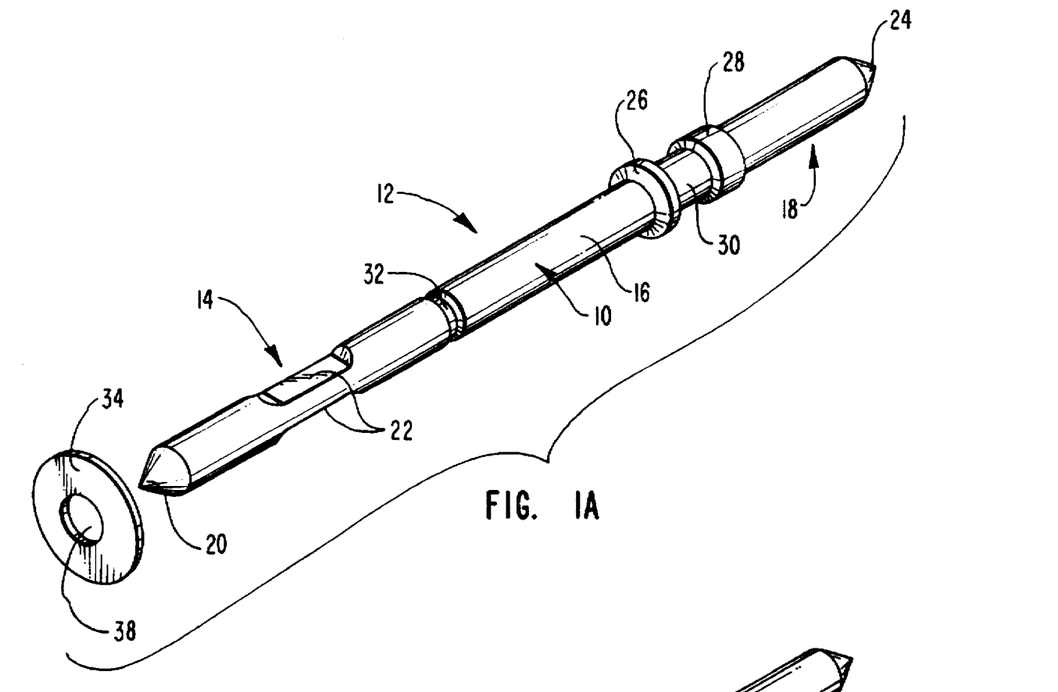
FIG. 1A is an exploded perspective view of a preferred insulating connector rod having a substantially pointed tip at either end shown being fitted with a locking device.

Referring to FIG. 1A, in a first preferred design of the connector rod of the present invention, the connector rod 10 includes an elongate shaft 12 that is preferably cylindrical ellipsoidal. The elongate shaft 12 includes a penetrating segment 14, a mesial segment 16, and a trailing segment 18. The penetrating segment 14 includes a substantially pointed penetrating tip 20 disposed at a first end of the connector rod 10 and at least one recessed portion 22 for receiving flowable concrete or other hardenable structural material therein for anchoring the connector rod within the first structural layer upon curing or hardening of the structural material.

The trailing segment 18 also includes a substantially pointed tip 24 at the other end of the connector rod 10, but is designated as a trailing tip 24 for clarity. The penetrating tip 20 and the trailing tip 24 may or may not be identical in size or design and will often only be distinguishable in view of the placement, if any, of a fixed ridge or flange 26 disposed at or near the interface between the mesial segment 16 and the trailing segment 18. In the event that the ridge or flange 26 is not integrally molded within the connector rod 10, but is only later attached later as a plastic washer (FIG. 2), the penetrating tip 20 and trailing tip 24 may very well be indistinguishable before attachment of the ridge or flange 26.

The trailing segment 18 also includes means for anchoring the trailing segment within the second structural layer upon curing or hardening of the structural material. An example of structure that would serve this anchoring purpose is a protrusion 28, which is disposed between the ridge or flange 26 and the trailing tip 24. Hardenable structural material can flow into and harden within a recess 30 defined by the portion of the trailing segment 18 between the ridge or flange 26 and the protrusion 28. Alternatively, the anchoring means could be at least one recessed portion (not shown) similar to the at least one recessed portion 22 within the penetrating segment 14.

In a preferred method of use, the ridge or flange 26 will be fixed in place prior to placement of the connector rod 10 through the insulating layer. This may be accomplished by integrally molding the ridge or flange 26 within the connector rod 10, as shown in FIG. 1A. Alternatively, the ridge or flange 26 may comprise a plastic washer or other appropriate ridge-forming device that is attached onto the connector rod 10 prior to insertion through the insulating layer (FIG. 2). In either scenario, the ridge or flange 26 provides a definite stopping point, which constitutes means for limiting the penetration depth of the connector rod 10 through the insulating layer. This helps the technician place the connector rod 10 through the insulating layer to the correct depth quickly, easily, and accurately virtually every time.

Figure 1B:
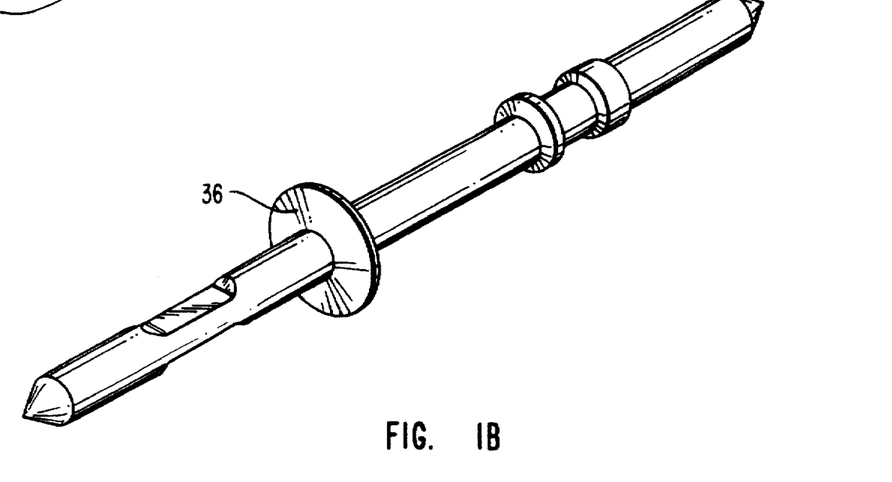
FIG. 1B is a perspective view of the connector rod of FIG. 1A having been fitted with the locking device.
Figures 1C, 2:
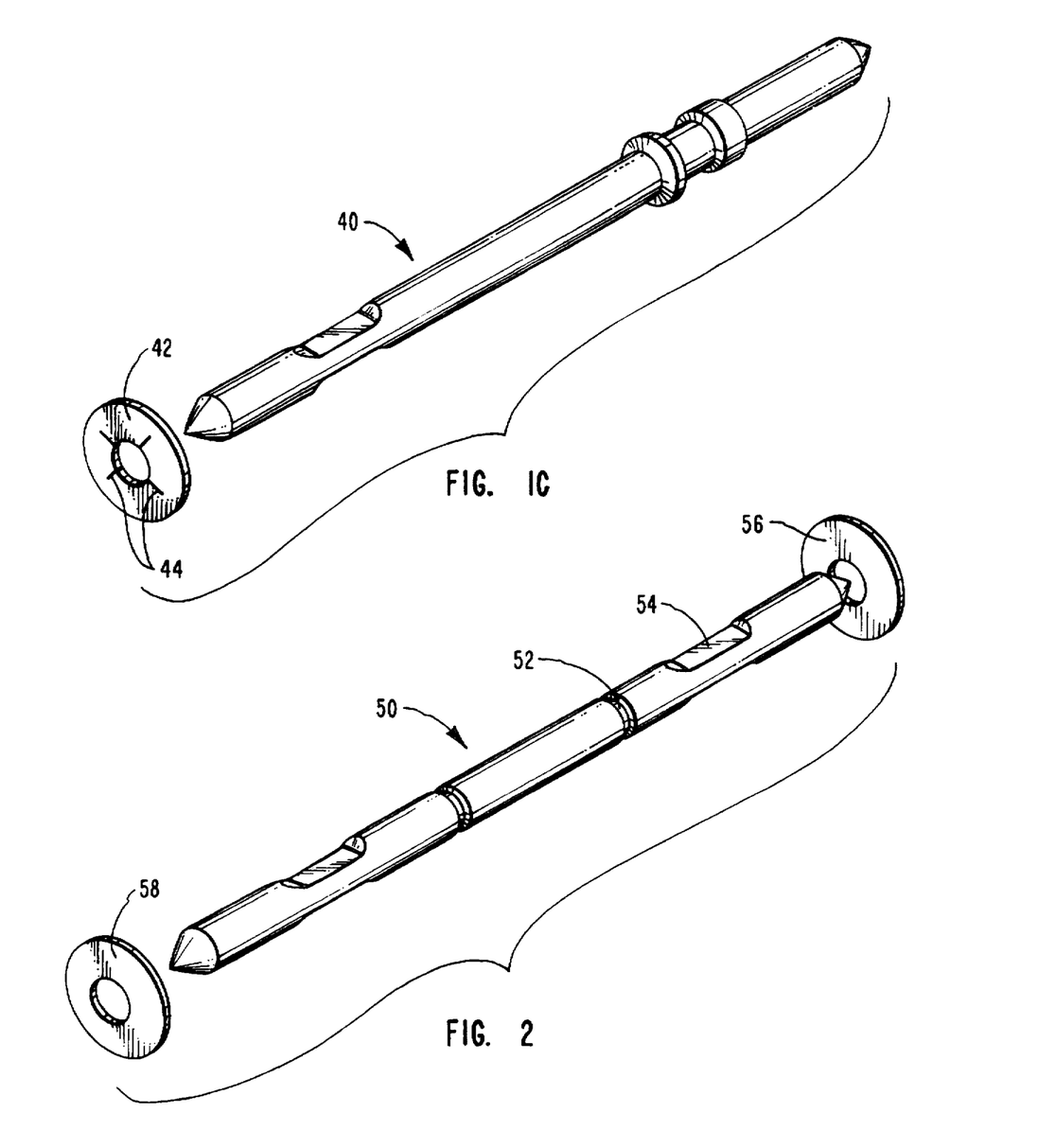
FIG. 1C is an exploded perspective view of an alternative insulating connector rod having a substantially pointed tip at either end shown being fitted with a locking device.
FIG. 2 is an exploded perspective view of an alternative embodiment of a connector rod of the present invention being fitted with an orienting device and a locking device.

Located at or near the interface between the mesial segment 16 and the penetrating segment 14 are means, such as a groove or recess 32, for attaching a locking device, such as a plastic washer 34, to form a second ridge or flange 36 at or near the interface between the mesial segment 16 and penetrating segment 14, as shown in FIG. 1B. This second ridge or flange 36 provides means for locking the connector rod 10 in place after placement within the insulating layer so that it will not pull out or otherwise shift out of position once it is properly placed. The means for attaching the plastic washer 34 at or near the interface between the mesial segment 16 and penetrating segment 14 comprises the groove or recess 32 that is configured such that, once the plastic washer 34 is slid over the penetrating segment 14 and into the groove or recess 32, the plastic washer 34 will be reliably secured in place when subject to ordinary loads associated with placing the insulating layer within the vertical form and pouring concrete on either side of the insulating layer within the form.

Nevertheless, in cases where the technician wishes to remove the connector for any reason, the locking mechanism provided by the groove or recess 32 and the plastic washer 34 can be adapted to allow for such removal. In this scenario, the groove or recess 32 and washer 34 may be configured such that they can be locked together upon rotating the washer 34 relative to the connector rod 10. This may be done, for example, by designing the connector rod 10 to have a generally ellipsoidal profile (not shown) and the hole 38 within the washer 34 to be generally elliptical (not shown). The groove or recess 32 might be designed to have a more circular profile such that when the washer 34 is rotated relative to the connector rod 10, the narrower portion of the elliptical hole 38 will be positioned nearer the widest portion of the surface of the connector rod 10, thereby causing the washer 34 to become locked in place (not shown). Rotating the washer 34 in the opposite direction to realign the ellipse of the washer hole 38 and the elliptical surface of the connector rod 10 would then cause the washer 34 to be unlocked from the groove or recess 32 (not shown).

Referring to FIG. 1C, the means for locking the connector rod in place within the insulating layer might simply constitute a self-locking washer 42 that is press-fitted over a connector rod 40 that is similar to connector rod 10 except that it does not include the locking groove or recess 32. The washer 42 is held in place due to the pressure of the inner wall of the washer 42 against the outer surface of the connector rod 40. It is pushed on until it reaches the insulating layer, thereby causing the connector rod to be locked in place. The washer may also be adapted with little cuts 44 around the interior wall in order to allow the inner wall to flex somewhat when the washer 42 is being inserted over the connector rod 40.

Finally, although plastic washers are preferred, the washers 34, 42 can be made of any material that allows for reliable locking of the connector rod in place after being inserted through the insulating layer. Because the washers 34, 42 are to be located on the outer surface of the insulating layer, they can be made of, e.g., metal without adversely affecting the insulating ability of the insulating layer and the overall composite wall structure.

In an alternative embodiment, the connector rod of the present invention might be designed to function equal or similar to the connector rod 50 shown in FIG. 2. The connector rod 50 is similar in design and function to connector rod 10 of FIG. 1A, except that the ridge or flange 26 of connector rod 10 has been eliminated and replaced with groove or recess 52. In addition, the means for securing the trailing portion 18 of connector rod 10 has been modified such that the protrusion 28 has been eliminated and replaced with at least one recessed portion 54 disposed between the groove or recess 52 and the trailing tip 24 similar to the at least one recessed portion 22 of connector rod 10.

Because the connector rod 50 shown in FIG. 2 appears to be substantially symmetrical, the penetrating segment 12 and trailing segment 18 are virtually indistinguishable until an orienting device, such as one of first and second washers 56, 58, is secured to the connector rod 50. In a preferred method of use, the connector rod 50 is first fitted with the first washer 56, which, when locked in place, will serve as means for orienting the connector rod 50 during insertion through the insulating layer. In particular, the washer 56 will act as a stop that will limit the degree of penetration of the connector rod 50 through the insulating layer. This allows the technician to place each of the connector rods 50 through the insulating layer to the same depth every time. Thereafter, the second washer 58 is secured in place within the groove or recess 32 at or near the intersection of the penetrating segment 14 and mesial segment 16 in order to provide means for locking the connector rod 50 in place in the desired orientation within the insulating layer.

Alternatively, the connector rod 50 and washers 56, 58 can be modified to provide means for locking and unlocking the washers 56, 58 in place on the connector rod 50, as explained above. Similarly, one or both of the grooves or recesses 32, 52 can be eliminated and the corresponding washer be adapted to be held in place in a press-fit manner. However, it will generally not be preferable to modify the orienting means in this manner, since this may make it more difficult to correctly place the orienting washer 58 in the correct location each time, which might cause varying placement depths of the multiple connector rods 50 being placed within the insulating layer.

Figure 3A:
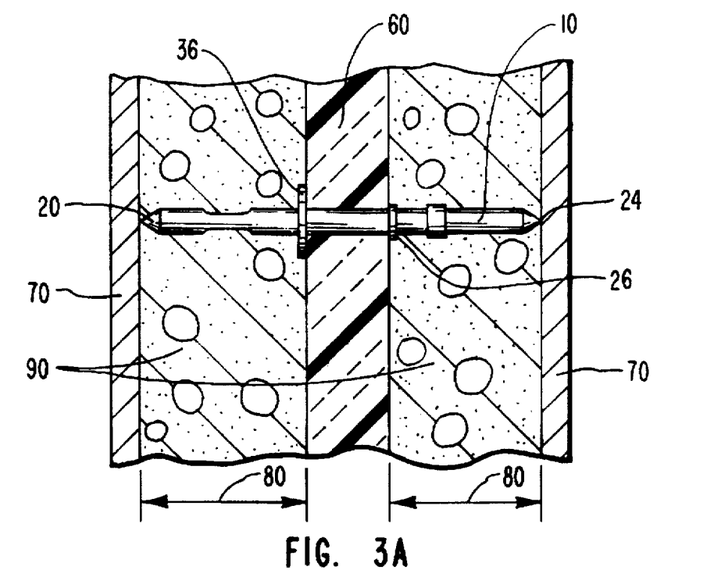
FIG. 3A is a cross-section view of composite wall structure formed using the cast-in-place method and one of the connector rods of FIG. 1.

In general, the connector rods of the present invention, as illustrated above, are designed to be especially useful in the manufacture of composite wall structures using the cast-in-place method, which is illustrated in FIG. 3A using the connector rod 10 illustrated in FIG. 1A. In this method, an appropriate number of the connector rods are inserted through an insulating layer 60 to a depth determined by the location of the first ridge or flange 26. Thereafter, formation of the second ridge or flange 36 by attachment of washer 34 on the other side of the connector rod 10 locks the connector rod 10 in place in the desired orientation. When the insulating layer 60 is placed between the sidewalls 70 of a form, the substantially pointed penetrating tip 20 and trailing tip 24 make significant abutting contact with the two sidewalls 70, which serve to orient the insulating layer 60 at the appropriate distance between the two essentially parallel side walls 70 in conjunction with the locking action of the first and second ridges or flanges 26 and 36. In an alternative embodiment, the design of the penetrating tip 20 and trailing tip 34 can be changed from a conical shape to a pyramidal shape (not shown) that can be 3-, 4-, or multi-faceted without significantly altering the utility of the connector rods of the present invention. However, while a chisel-shaped end (not shown) would likely be superior to the rectangular-shaped ends of the prior art connector, they are less preferred than the conical or pyramid-shaped tips in the preferred connector rods.

Once the insulating layer 60 has been appropriately situated between the form sidewalls 70, concrete or other hardenable structural material is then poured within spaces 80 on either side of the insulating layer 60 between the insulating layer 60 and the two sidewalls 70 to form structural layers 90. In order to avoid unduly stressing one side of the insulating layer 60 during formation of the structural layers 90, it is usually preferable to pour equal or similar depths of concrete or other structural material within spaces 80 in order to substantially equalize the pressure being exerted on either side of the insulating layer 60 at any particular moment. Once the concrete or other structural material has sufficiently cured or hardened, the form sidewalls 70 can be removed from around the structural layers 90 of the composite wall structure.

Figure 3B:
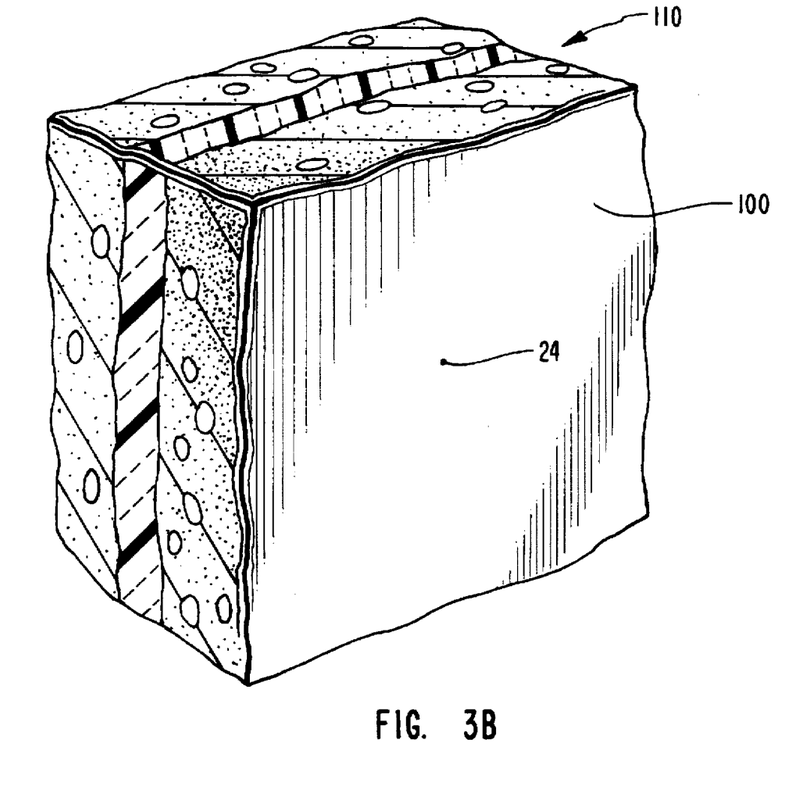
FIG. 3B is a breakaway perspective view of the composite wall structure of FIG. 3A showing minimal exposure of one end of the connector rod through the composite wall surface.
Figure 4A:
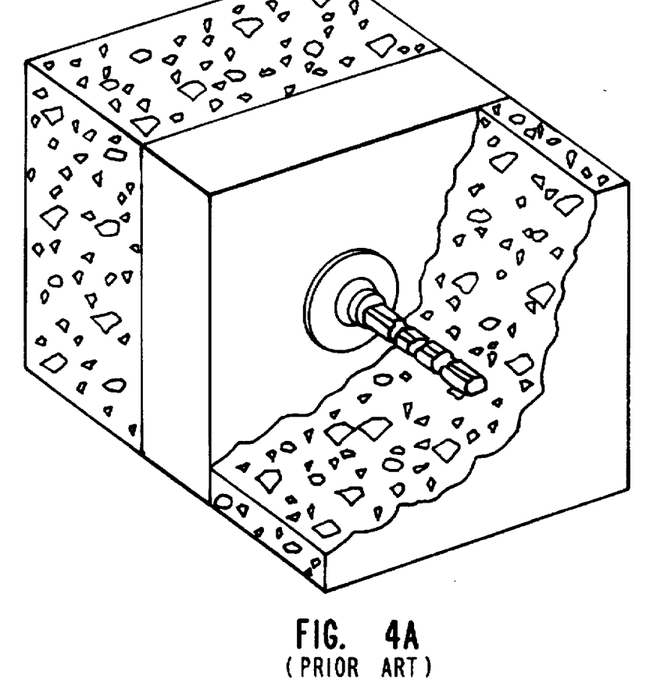
FIG. 4A is a breakaway perspective view showing the use of a prior art connector in a composite wall structure.
Figure 4B:
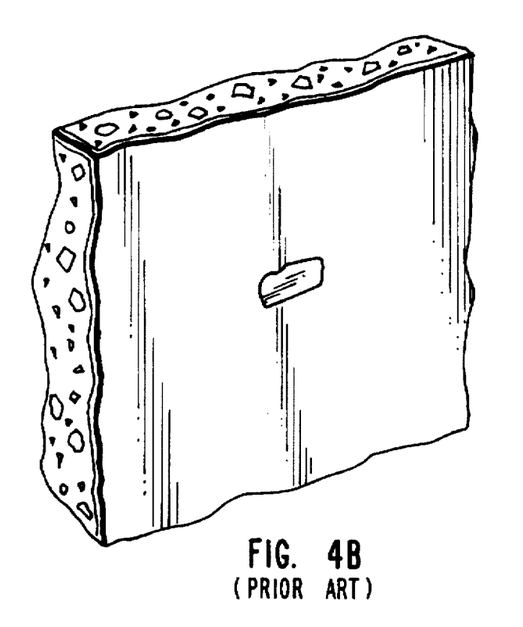
FIG. 4B is a breakaway perspective view of a side of the structural layer of a composite wall structure made by the cast-in-place method using the connector shown in FIG. 4A and showing the increased exposure of one end of the connector rod through the composite wall surface.

As shown in FIG. 3B, an important advantage of using the connector rods of the present invention is that little or virtually none of the connector rod tips (e.g., trailing tip 24) will be exposed within the outer surface 100 of the final hardened composite wall structure 110. This is because the connector rods terminate at either end with substantially pointed tips 20, 24 having a cross-section that is essentially reduced to zero at the end. This sharply contrasts with the rectangular surface exposure that will occur when using the prior art connectors of rectangular cross section, as shown in FIGS. 4A and 4B. This reduced exposure would also be true for chisel-shaped ends, which would terminate in a line rather than a rectangle in the outer surface of the composite wall structure (not shown).

The advantage of using the pointed end connector of the present invention is at least three-fold: 1) the reduced surface contact between the substantially pointed tips and the form sidewalls will greatly reduce the friction vis-a-vis the rectangular-faced connector of the prior art, which will facilitate placement of the insulating layer 60 between the sidewalls 70 of the form; 2) upon removal of the form sidewall 60 from the composite wall structure 110, only the pointed ends 20, 24 of the connector rods will be exposed within the composite wall surface 100, which greatly reduces or eliminates potential visual nuisance and greatly reduces exposure of the connector rods to potentially destructive environmental elements, such as chemical or solar attack; and 3) the reduced cross section at the interface between the substantially pointed connector rods of the present invention and the sidewalls 70 facilitates more complete consolidation of the concrete or other structural material of the outer wall surface 100 in or near the area around the pointed tips compared to, e.g., a rectangular-faced prior art connector, which would tend to prevent complete consolidation of concrete just beneath the flat portion of the connector abutting the sidewalls 70.

In general, the structural material used to form the structural layers 90 of the composite wall structures made according to the present invention may comprise any suitable material which can flow when initially cast and then harden to form a generally rigid, structural layer. In a preferred embodiment, the structural layers comprise a concrete material formed from a mixture including hydraulic cement, water, an aggregate material, and other appropriate admixtures. Concrete is preferred because of its low cost, high strength, and ease of casting compared to other materials. Nevertheless, any appropriate structural material may be used, such as high strength polymers, resins or other materials, which can flow when cast and later be hardened.

The insulating layer 60 may comprise any appropriate insulating material, such as polystyrene foam, fiberglass, aerogel, xerogel, xonotlite, seagel, polyisocyanate foam, polyurethane foam, urea-formaldehyde foam, and low density, highly insulating cementitious materials. Such insulating materials are given only by way of example and not by limitation.

The insulating layer 60 preferably includes a plurality of holes that are predrilled or punched therethrough through which the connector rods of the present invention can be inserted, as described above. Because of the piercing effect of the penetrating tip 20, it is often preferable to drill holes having a smaller diameter compared to the diameter of the elongate shaft 12 to ensure a tight fit within the insulating layer. This helps to prevent incursion of concrete into the insulating layer, which can cause a thermal bridge, and undermine the utility of the present invention. In many cases, no holes will be required at all because of the self-tapping nature of the substantially pointed penetrating tip 20.

The various connector rods described herein were used in experimental composite wall structures and were found to have more than adequate shear strength to hold together the three layers of the composite wall structures that were tested. In fact, in all cases when a stress strong enough to cause a failure of the composite wall structure was applied, it was the concrete structural layer that failed in each instance. The connector rods were left intact.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A connector rod in combination with an insulating composite wall structure including first and second structural layers comprising a hardenable material and an insulating layer disposed between the first and second structural layers, wherein the connector rod comprises a highly insulating material and includes:
   an elongate shaft having a penetrating segment, a trailing segment, and a mesial segment disposed between the penetrating and trailing segments;
   a first substantially pointed tip at an end of the penetrating segment distal to the mesial segment for penetrating completely through the insulating layer;
   a second substantially pointed tip at an end of the trailing segment distal to the mesial segment;
   orienting means disposed approximately where the trailing segment and mesial segment intersect for limiting penetration of the connector rod through the insulating layer;
   first anchoring means within the penetrating segment for anchoring the connector rod within the first structural layer when the first structural layer is substantially hardened; and
   second anchoring means within the trailing segment for anchoring the connector rod within the second structural layer when the second structural layer is substantially hardened,
   wherein the first and second substantially pointed tips terminate approximately at respective outer surfaces office first and second structural layers and facilitate consolidation of the hardenable material around the ends of the penetrating and trailing segments such that the outer surfaces of the first and second structural layers are substantially smooth and continuous around the first and second substantially pointed tips.

2. A connector rod as defined in claim 1, wherein the orienting means includes a flange integrally molded within the connector rod at or near where the trailing segment and the mesial segment intersect.

3. A connector rod as defined in claim 1, wherein the orienting means includes a disk-like structure that is attached to the connector rod and substantially locked in place in a desired location at or near where the trailing segment and the mesial segment intersect.

4. A connector rod as defined in claim 1, whrein the first anchoring means within the penetrating segment comprises at least one recess in the penetrating segment disposed between the first substantially pointed tip and the mesial segment.

5. A connector rod as defined in claim 1, wherein the second anchoring means within the trailing segment comprises at least one recess in the trailing segment disposed between the second substantially pointed tip and the mesial segment.

6. A connector rod as defined in claim 1, wherein the connector rod is formed from a polycarbonate material.

7. A connector rod as defined in claim 1, wherein the connector rod is impregnated with fibers.

8. A connector rod as defined in claim 1, further including engageable locking means disposed at or near where the penetrating segment and mesial segment intersect for maintaining the connector rod in a desired orientation relative to the insulating layer.

9. A connector rod as defined in claim 8, wherein the engageable locking means includes a disk-like structure that is attached to the connector rod and substantially locked in place in a desired location at or near where the penetrating segment and the mesial segment intersect.

10. A connector rod as defined in claim 9, wherein the disk-like structure comprising a self-locking washer.

11. A connector rod as defined in claim 8, wherein the connector rod further includes a locking groove at or near where the penetrating segment and the mesial segment intersect and wherein the disk-like structure comprises a washer that is locked in place within the locking groove in order to form the engageable locking means.

12. A highly insulating composite wall structure comprising a first structural layer including a hardenable structural material, a second structural layer including a hardenable structural material, and an insulating layer disposed between the first and second structural layers, the first structural layer, the second structural layer, and the insulating layer being secured together by means of a plurality of connector rods which comprise an insulating material and include:
   (a) an elongate shaft having a penetrating segment embedded substantially within the first structural layer, a trailing segment embedded substantially within the second structural layer, and a mesial segment disposed substantially within the insulating layer;
   (b) a first substantially pointed tip at an end of the penetrating segment distal to the mesial segment for penetrating completely through the insulating layer;
   (c) a second substantially pointed tip at an end of the trailing segment distal to the Mesial segment;
   (d) orienting means disposed approximately where the trailing segment and mesial segment intersect for limiting penetration of the connector rod through the insulating layer during formation of the composite wall structure;
   (e) locking means disposed approximately where the penetrating segment and mesial segment intersect for maintaining the connector rod in a desired orientation relative to the insulating layer during formation of the composite wall structure;
   (f) first anchoring means within the penetrating segment for anchoring the connector rod within the first structural layer when the first structural layer is substantially hardened; and
   (g) second anchoring means within the trailing segment for anchoring the connector rod within a second structural layer when the second structural layer is substantially hardened,
   wherein upon formation of the composite wall structure the first and second substantially pointed tips terminate approximately at respective outer surfaces off the first and second structural layers and facilitate consolidation of the hardenable material around the ends of the penetrating and trailing segments such that the outer surfaces of the first and second structural layers are substantially smooth and continuous around the first and second substantially pointed tips.

13. A highly insulating composite wall structure as defined in claim 12, wherein at least one of the first and second structural layers comprises a concrete material.

14. A highly insulating composite wall structure as defined in claim 12, wherein the insulating layer comprises a polystyrene foam.

15. A highly insulating composite wall structure as defined in claim 12, wherein the insulating layer comprises fiberglass.

16. A highly insulating composite wall structure as defined in claim 12, wherein only a minor portion of the substantially pointed tips of the connector rods are visible.

17. A connector in combination with an insulating composite wall structure including first and second structural layers comprising a hardenable material and an insulating layer disposed between the first and second structural layers, wherein the connector comprises a highly insulating material and includes:

(a) an elongate shaft having a penetrating segment, a trailing segment, and a mesial segment disposed between the penetrating and trailing segments;

(b) a first substantially pointed tip at an end of the penetrating segment distal to the mesial segment for penetrating completely through the insulating layer;

(c) a second substantially pointed tip at an end of the trailing segment distal to the mesial segment;

(d) orienting means disposed approximately where the trailing segment and mesial segment intersect for limiting penetration of the connector through the insulating layer;

(e) at least one recess in the penetrating segment disposed between the first substantially pointed tip and the mesial segment for anchoring the connector within the first structural layer when the first structural layer is substantially hardened; and (f) at least one recess in the trailing segment disposed between the second substantially pointed tip and file mesial segment for anchoring the connector within the second structural layer when the second structural layer is substantially hardened, wherein the first and second substantially pointed tips terminate approximately at respective outer surfaces of the first and second structural layers and facilitate consolidation of the hardenable material around the cods of the penetrating and trailing segments such that the outer surfaces of the first and second structural layers are substantially smooth and continuous around the first and second substantially pointed tips.

18. A connector as defined in claim 17, wherein the orienting means includes a flange integrally molded within the connector at or near where the trailing segment and the mesial segment intersect.

19. A connector as defined in claim 17, wherein the orienting means includes a disk-like structure that is attached to the connector and substantially locked in place in a desired location at or near where the trailing segment and the mesial segment intersect.

20. A connector as defined in claim 17, further including engagable locking means disposed at or near where the penetrating segment and mesial segment intersect for maintaining the connector in a desired orientation relative to the insulating layer.

* * * * *

UNITED STATES PATENT AND TRADEMARK OFFICE
CERTIFICATE OF CORRECTION

PATENT NO. : 5,673,525

DATED : October 7, 1997

INVENTOR(S) : David O. Keith; David M. Hansen

It is certified that error appears in the above-identified patent and that said Letters Patent is hereby corrected as shown below:

Col. 3, line 8, after "typically" change "carded" to --carried--

Col. 3, line 64, after "sharp" change "comers" to --corners--

Col. 5, line 37, before "of the" change "mount" to --amount--

Col, 8, line 67, after "formed by" change "pulltruding" to --pull-truding--

Col. 10, line 65, change "segment 12" to --segment 14--

Col. 11, line 45, change "tip 34" to --tip 24--

Col. 14, line 45, after "to the" change "Mesial" to --mesial--

Col. 14, line 67, after "surfaces" change "off" to --of--

UNITED STATES PATENT AND TRADEMARK OFFICE
CERTIFICATE OF CORRECTION

PATENT NO. : 5,673,525

DATED : October 7, 1997

INVENTOR(S) : David O. Keith; David M. Hansen

It is certified that error appears in the above-identified patent and that said Letters Patent is hereby corrected as shown below:

Col. 16, line 1, before "at least" change "(c)" to --(e)--

Col. 16, line 7, after "tip and" change "file" to --the--

Col. 16, line 16, before "of the" change "cods" to --ends--

Signed and Sealed this

Fifth Day of May, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,673,525
DATED : October 7, 1997
INVENTOR(S) : David O. Keith and David M. Hansen It is certified that error appears in the above-identified patent and that said Letters Patent is hereby corrected as shown below:

<u>Column 13,</u>
Line 48, change "office" to -- of the --

Signed and Sealed this

Fifteenth Day of October, 2002

Attest:

JAMES E. ROGAN
Attesting Officer                 *Director of the United States Patent and Trademark Office*